United States Patent Office 3,618,163
Patented Nov. 9, 1971

3,618,163
APPPARATUS FOR CURING ELONGATED ARTICLES
Hugh Lorain Folkes, St. Leonard's-on-Sea, England, assignor to Dunlop Holdings Limited, Birmingham, England
Original application Nov. 4, 1966, Ser. No. 592,131. Divided and this application Aug. 5, 1969, Ser. No. 862,568
Claims priority, application Great Britain, Nov. 10, 1965, 47,594/65
Int. Cl. B29c 3/02; B29h 5/20; B29b 5/22
U.S. Cl. 18—2 F
15 Claims

ABSTRACT OF THE DISCLOSURE

A curing press for elongated articles having a series of press units which successively engage successive portions of the article and move it and a unit of the press while they are in engagement through the press while the press units apply compressive force and heat to successive portions of the article. The article and the press units in engagement therewith are moved through the press in a stepwise manner and each portion of the article has compressive force applied to it while it is stationary.

RELATED U.S. APPLICATION

This application is a division of co-pending application Ser. No. 592,131 filed Nov. 4, 1966 (now abandoned) of the same inventor and same assignee.

This invention relates to a method and apparatus for the curing in a curing press of elongated articles whose length is greater than that of the press. In particular, the invention relates to the curing of rubber and plastics mechanical belting and like elongated articles.

Mechanical belting is normally cured in a press comprising two flat platens. A length of the uncured belting is placed between the platens which are then urged towards each other by hydraulic or other means, to press the belting between them, the platens being heated or cooled as required. After a suitable period of time the platens are separated and the cured portion of the belting (or other article) is moved forward. This process is repeated until the required length of material has been cured. However, there are practical difficulties which make this conventional method inconvenient but in respect of which no satisfactory solution has hitherto been found. The use of a single press means that the method is essentially a "batch" process in that when any particular length of article has been cured the press has to be opened and the cured portion of the article withdrawn from the press thereby drawing behind a portion of uncured material, the boundary between cured and uncured material being advanced to the forward end of the press before the latter is closed and the curing cycle repeated. This method involves a considerable amount of labour, and difficulties arise in the exact alignment of the uncured portion within the press so as to avoid double-curing or under-curing. A further major disadvantage of the conventional method is that as the curing is interrupted when the press is opened and not resumed until the press is closed on the succeeding portion of uncured material, there is in effect no production during that time and the overall production is much less than is desired, especially in view of the large capital cost of the machinery used.

We have now devised, according to the present invention, a method and apparatus for curing mechanical belting of rubber or plastics, and other elongated articles which avoids or very largely mitigates the disadvantage referred to above.

According to one aspect of the present invention, a method of curing an elongated article comprises pressing the article in a press comprising a number of press units, the press units being successively engaged with the article at a first station and moving in engagement with the article to a second station where the press units are successively disengaged and returned to the first station.

According to another aspect of the invention a method of curing an elongated article comprises pressing the article in a press comprising a number of press units which enclose a corresponding number of contiguous portions along the length of said article, curing said portions so that the cure of the portion within the unit at one end of the press is followed in succession by the cure of the portions following said first portion, and after each of said portions is cured, removing its press unit, and successively adding further press units to the end of the press distant from said first portion, thereby enclosing further successive portions of said article, and subjecting said further portions to curing conditions within said further units.

According to a third aspect of the invention, apparatus for curing elongated articles comprises a press in the form of a number of press units, the press being arranged so that the press units are successively engageable with an article at a first station, movable in engagement with the article to a second station, and disengageable from the article at the second station.

The invention also provides an article produced by apparatus according to the invention, and mechanical belting produced by apparatus according to the invention.

The word "curing" as used in this specification with relation to articles of rubber refers to vulcanization of the rubber, and in relation to plastics and other materials relates to any process requiring the application of pressure and the control of temperature to convert material in one form to another, for instance, to convert a pasty or liquid material to a solid, self-supporting form.

In one preferred embodiment of the invention, on completion of a curing operation and being disengaged from the article at the second station, the press units are employed to execute a further curing operation in the course of returning to the first station. The further curing operation may comprise transfer of the press units to, and successive engagement of the press units with, an article at a third station and movement of the press units in engagement with this article to a fourth station where the press units are successively disengaged and transferred to the first station.

A number of embodiments of the invention will now be described by way of example, with reference to the accompanying drawings, in which.

The invention is described herein with particular reference to the curing of conveyor belting, but as indicated above the method and apparatus of the invention are applicable to the curing of rubber and plastics elongated articles in general. Furthermore, the method and apparatus of the invention are applicable to the curing of articles whether elongated or otherwise comprising material other than rubber or plastics. Thus thermosetting resin materials and materials incorporating thermosetting resins, for instance chipboard or plywood, can be cured using this invention.

Figure 1:
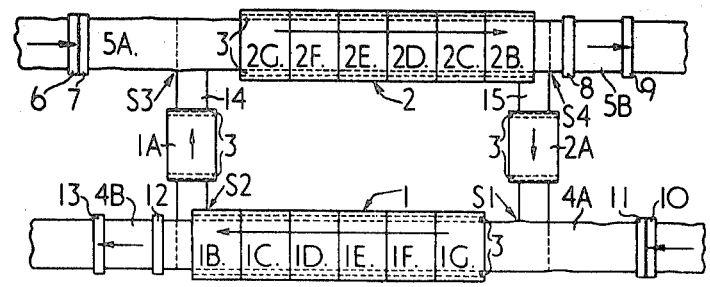
FIGS. 1 to 4 are diagrammatic plan-view representations of a sequence of successive steps in the curing of two lengths of conveyor belting in two parallel presses.

In the arrangement shown in FIG. 1 two identical presses 1 and 2 each consist of six identical press units, the units of press 1 extending between a first station S1 and a second station S2 and being 1B, 1C, 1D, 1E, 1F and 1G, and the units of press 2 extending between a third station S3 and a fourth station S4 and being 2B, 2C, 2D, 2E, 2F and 2G. The units of each press, which are in contiguity with each other, each have an upper platen (shown in FIGS. 1 to 4) and a lower platen (not shown), the two platens having means (not shown) to urge them towards each other by hydraulic or other suitable power, edge irons 3 insertable between them, and heating means (not shown) such as steam pipes, for raising the unit to a suitable curing temperature and maintaining it at that temperature. At the stage shown in FIG. 1 the pressure applied to urge together the platens of units 1G and 2G, which have just been added to the presses 1 and 2 at the first and third stations S1 and S3 respectively, is less than that applied to the platens of the other units of the presses.

The conveyor belting 4 of press 1 consists of three portions: an uncured portion 4A which has not yet entered the press, a portion (not shown) within the press and a third portion 4B of cured belting that has left the press. Similarly the conveyor belting 5 of press 2 consists of an uncured portion 5A, a portion (not shown) within the press and a cured portion 5B.

The means for producing in the reinforcement of belting 5, the longitudinal tension required during curing and pressing and the means for holding that tension, consists of stepwise transfer means such as longitudinally 'fixed' clamps 7 and 8 and longitudinally "movable" clamps 6 and 9. Similarly the tension means for the reinforcement of belting 4 consists of longitudinally "fixed" clamps 11 and 12 and longitudinally "movable" clamps 10 and 13. Each clamp consists of a pair of horizontal jaws, one of which is movable vertically by hydraulic or other means so that the jaws can be closed upon and hold the belt, or opened to allow the belt to pass between them.

It will be seen that the clamps which are "fixed" and not movable longitudinally are on the press side of each of the pairs of clamps. The lower platens (which support the belting) are themselves carried on horizontal tables (not shown in FIGS. 1 to 4). Interpress transfer means such as fixed base members 14, 15 are provided between the stations, on which press units can be transferred from the second station S2 to the third S3 and from the fourth S4 to the first S1. In FIG. 1 press unit 1A, with its edge irons, is supported by fixed base member 14 and is in the course of being transferred from the second station S2 to the third station S3. Similarly press unit 2A, supported by fixed base member 15, is in the course of being transferred from the fourth station S4 to the first station S1.

In FIG. 1 the tension in the reinforcement of the belting 4 is provided by clamps 10 and 13 which are shut firmly on the belting, clamps 11 and 12 being open. Similarly, the tension in the reinforcement of belting 5 is provided by clamps 6 and 9 which are shut firmly on the belting, clamps 7 and 8 being open. The arrows associated with clamps in FIG. 1 show the movement that took place in the immediately preceding step of the method.

Figure 2:
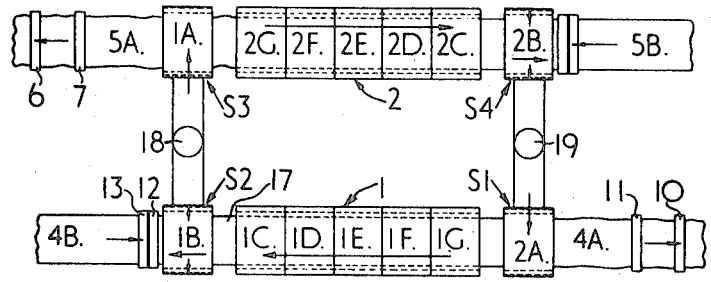

In FIG. 2 the presses 1 and 2 consist respectively of press units 1C, 1D, 1E, 1F and 1G, and 2C, 2D, 2E, 2F and 2G (1G and 2G being still pressed against the belting at a lower pressure than the other units). Press unit 2B has arrived at the fourth station S4, its platens having been separated. The portion 5B of the belting from which unit 2B has been released is in a fully-cured condition. Similarly, press unit 1B has arrived at the second station S2, the belting portion 17 being in a fully-cured condition. The press units 1A and 2A, which in FIG. 1 were supported by turntables not shown in FIG. 1 but shown in FIG. 2 as 18 and 19, have been turned through 180° on the turntables and forwarded respectively towards the third and first stations, the upper and lower platens of each unit being situated respectively above and below the belting but without yet being closed on the belting. The belting 4 is now held in tension by clamps 11 and 12 which are in the positions they occupied in FIG. 1. Clamps 10 and 13 have each been respectively moved to the right by a distance equal to the width of a press unit, clamp 10 now being separated from clamp 11 whereas clamps 12 and 13 are in contact with each other. Similar movement has taken place with clamps 6, 7, 8 and 9, of which clamps 7 and 8 are those which now hold the belting in tension while clamps 6 and 9 are open.

Figure 3:
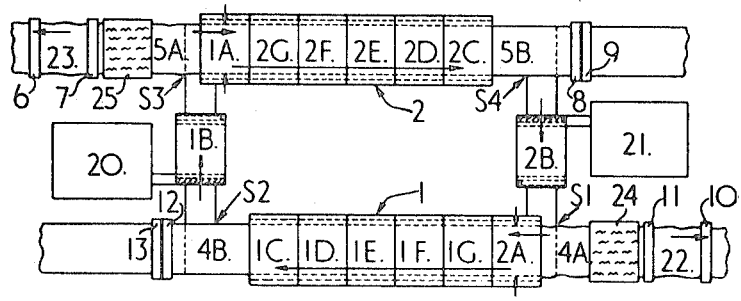

Wtih reference to FIG. 3, press 1 now consists of press units 1C, 1D, 1E, 1F, 1G and 2A, and press 2 consists of press units 2C, 2D, 2E, 2F, 2G and 1A, press units 1A and 2A having been added respectively to the tails of presses 2 and 1, their platens closed on the belting and their temperature raised. Press units 1G and 2G, which in FIG. 2 were shown as being at low pressure, now have that pressure increased to that of press units 1C, 1D, 1E and 1F and units 2C, 2D, 2E and 2F respectively. Press units 1B and 2B have been forwarded respectively to turntables 18 and 19 for rotation through 180° and if necessary change of edge irons, 20 and 21 represent respectively the means for changing the edge irons of the press units between successive curing operations thus making it possible to use the press continuously without stopping production when one belt is completed and one of a different thickness and width is started and making it possible to press two different sizes of belt on the two presses. The rotation is made to avoid the steam lines or other connections becoming crossed. The main steam line (not shown) feeding presses 1 and 2 preferably lies between the two presses, and if rotation through 180° of the press units being transferred were not made, it would result in the steam lines of the transferred press units being on the outer side of the press with consequent inconvenience in operation.

Clamps 6 and 10 are shown as having been moved a further short distance respectively from clamps 7 and 11, as indicated by the arrows touching clamps 6 and 10. Before this movement was made clamps 6 and 10 were shut firmly on the belting and consequently the belt portions 22 and 23 are subjected to a tension substantially the same as the tension in the belting within the press. 24 and 25 represent preheating means to preheat the uncured belting before it is fed to the presses and thereby to increase the output of the presses, but this is an optional feature and the success of the method of the invention is not dependent upon it.

Figure 4:
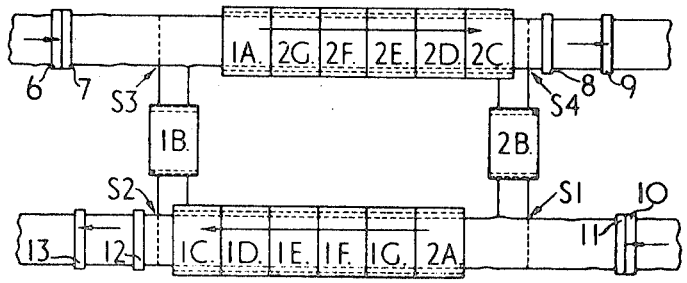

FIG. 4 shows the press units in the same order as shown in FIG. 3, but iron-changing means 20 and 21 and the heaters 24 and 25 are not shown.

The stage illustrated in FIG. 4 is that immediately following the movement (by means of hydraulic or other power) of belting 5 and its press units 2C, 2D, 2E, 2F, 2G and 1A towards the right of the drawing by an amount equal to the width of a press unit. This movement has been accompanied by opening clamps 7 and 8 so as to release the bolting and moving clamps 6 and 9 towards the right by a distance equal to the width of a press unit. Similarly, movement of the belting 4 and its press units 1C, 1D, 1E, 1F, 1G and 2A towards the left hand side of the drawing has been accompanied by opening clamps 11 and 12 and moving clamps 10 and 13 towards the left by a distance equal to the width of a press unit.

It will be seen that the disposition of the press units of presses 1 and 2, the press units in transfer across the fixed base members 14 and 15 and the tension clamps 6, 7, 8, 9, 10, 11, 12, and 13 is the same in FIG. 4 as in FIG. 1 and that the cycle illustrated in FIGS. 1–4 has resulted in the emergence from the press of one fully-cured portion of width equal to the length of a single press unit. Consequently, the first stage of the next cycle of the method is represented by FIG. 2 and so on.

In the specific process described above each cycle results in the whole of the belting portions within press units being cured to the same extent and at any particular stage of the cycle the contiguous portions within the press units constituting the press at that time are in states of cure which range from the almost fully-cured state of the portion in the press unit at the head of the press near stations S2 or S4 to a state of only very slight, if any, cure of the portion within the press unit at the tail of the press near stations S1 or S3. It will be seen, therefore, that the conditions of temperature and pressure used to effect cure are preferably selected so that a belting portion in any particular press unit reaches the fully-cured state at the time when its press unit is to be detached from the head of the press. Where the material being cured is one which is susceptible to "over cure," care has to be taken to select conditions which avoid that state.

If found convenient, the press units can move during transfer between presses, on a semi-circular path between the two base members or on a path which is partly curved and partly straight. In that event the rotation of the units through 180° during transfer from the second or fourth to the third or first station respectively is effected by the curved path and turntables can be dispensed with.

Figure 6:
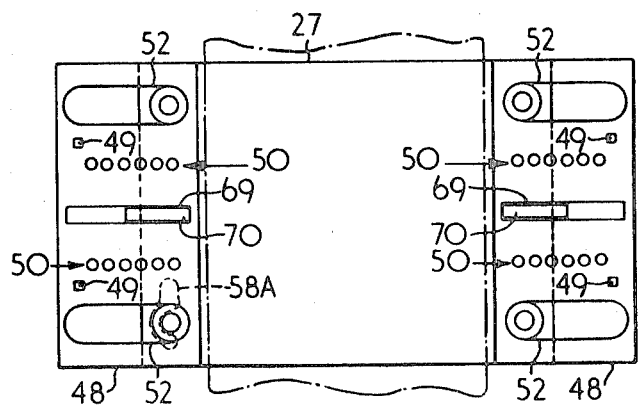
FIG. 6 shows a section on the line VI—VI of FIG. 5.
Figure 5:
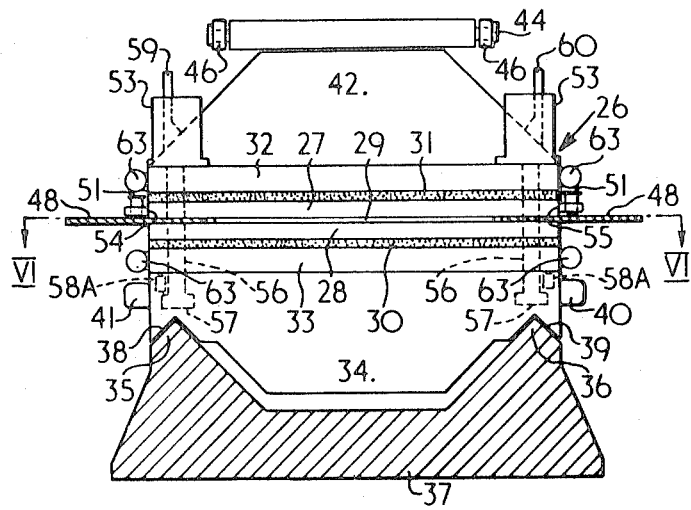
FIG. 5 shows a transverse cross-section through a continuously-heated press unit having its own compressive force-applying means in engagement with an article being cured.
Figure 7:
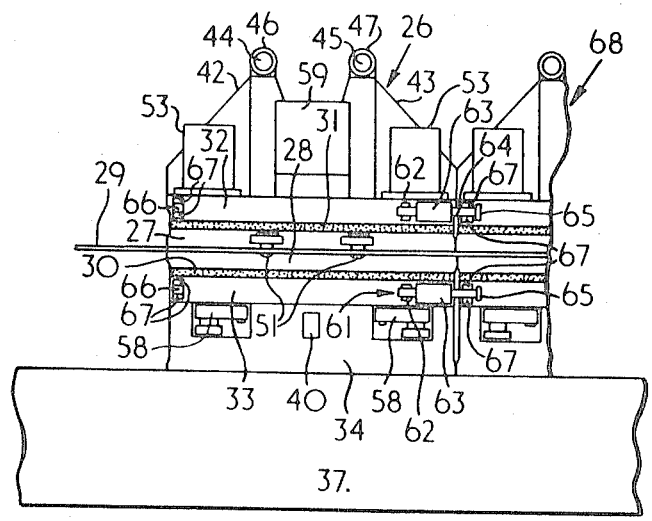
FIG. 7 shows a longitudinal cross-section through part of two adjacent press units of the type shown in FIGS. 5 and 6, each having its own compressive force-applying means.

As shown in FIGS. 5 to 7 a press unit 26 comprises horizontal rectangular platens 27 and 28 between which is located a portion 29 of conveyor belting. Press unit 26 further comprises insulation layers 30 and 31 to reduce the loss of heat from the platens during curing and tables 32 and 33 which ensure a uniform compressive force on the conveyor belting during curing, the arrangement being such that platens are sandwiched between the insulating layers which are themselves sandwiched between the tables.

The lower table 33 is supported by a support member 34 slidably located on rails 35 and 36 formed on fixed base member 37. The rails 35 and 36 are located in corresponding grooves 38 and 39 formed in support member 34, so that the whole press unit may slide along the fixed base member 37 during curing. Motive power to cause the press unit to slide thus is derived from an external fluid pressure operated means and is applied to the press units through drive brackets 40 and 41.

Upper table 32 is secured to two support brackets 42 and 43 extending upwardly from the table having mounted at their upper ends axles 44 and 45 one on each bracket, extending at right angles to the sides of the press unit, two pairs of wheels 46 and 47 being rotatably mounted, one pair on each axle, to engage overhead guide rails (not shown) at second station S2 or fourth station S4 at the end of a curing operation.

To control the width and thickness of the portion of belting 29 being cured, and to produce straight edges thereon, the press unit 26 is provided with two edge irons 48 in the form of plates having straight edges and adapted to be positioned with one edge of each iron in engagement with one edge of the portion of belting 29. The edge irons each have formed therein two openings 49 to provide locating sockets for fluid pressure operated means (not shown) to urge the irons into engagement with the belting, two series of apertures 50 being provided to cooperate with pins 51 associated with the upper platen 27 to hold the edge irons in the required position after engagement with the belting as described above. Two further apertures 52 in the form of slots adjacent each end of the iron are provided for a purpose to be described.

Press unit 26 is provided with four similar piston and cylinder assemblies 53 operable by fluid pressure to draw together the two platens, thereby exerting compressive forces on the belting 29 being cured. The piston and cylinder assemblies are all mounted on the upper rectangular table 32, one near each corner thereof in order that at least one assembly should be located adjacent each edge of the opposite side edges 54 and 55 (FIG. 5) of the upper platen 27.

Each piston and cylinder assembly 53 comprises a piston rod 56 attached at one end to a piston (not shown) and having an abutment 57 at the other end, the piston rod being arranged to extend through the apertures 52 formed in the edge irons 48, and corresponding alignable apertures in the tables 32, 33, insulation layers 30, 31, platens 27, 28 and the support member 34.

In FIG. 5, the piston rod 56 is shown fully extended outwardly from the cylinder. In order that, on admission of fluid pressure to the cylinder and withdrawal of the piston rod into the cylinder, the platens may be urged together, removable means in the form of a swingable locking piece 58A (only one being shown in FIG. 6) is provided for each piston and cylinder assembly to engage the abutment 57 and prevent withdrawal thereof so that the tables 32, 33 and thereby the platens 27, 28 are squeezed between the cylinders and the abutments of the assemblies 53.

Control panels 59 and 60, one on each side of the press unit 26 mounted on the upper table 32 are provided to control the supply of fluid pressure to the various cylinders on the unit, valves (not shown) on the panels being operated by rods and cams (not shown) at appropriate points in the course of any given curing operation.

The various connections necessary for the supply of steam, cold water, hydraulic power and other requirements to the press units are made to the inner side of the press units with respect to the closed circuit path which they follow, by means of flexible pipes (not shown) and a services conveyor.

In the apparatus shown in FIGS. 5 to 7 adjacent press units are secured end to end during curing of the belting by means of two fluid-operated latch mechanisms 61 on each press unit, mounted horizontally, one on each side edge of each table adjacent one end of each side edge. Each latch mechanism comprises a hinge 62 on which a cylinder 63 is mounted and is thereby swingable in the plane of the table. A piston (not shown) is located in each cylinder 63, and has a piston rod 64 with an abutment 65 at the free end thereof. Each latch mechanism further comprises a latch portion 66 in the form of two separate raised members 67 arranged so that piston rod 64 can pass between them by swinging cylinder 63 on hinge 62, but when fluid pressure is supplied to cylinder 63 tending to withdraw its piston, abutment 65 engages raised members 67 of the adjacent press unit 68 thereby urging the units together.

Edge irons 48 are each provided with a rectangular guide slot 69 extending parallel to the end edges of the edge iron, in each of which is located a corresponding guide lug 70 attached to lower platen 28, this provision being to ensure that the edge irons are always positioned parallel to the side edges of the platens, thereby ensuring that substantially straight edges are formed on the belt throughout its length.

A curing operation employing the apparatus shown in FIGS. 1 to 7 will now be described.

In FIG. 1, press unit 1A, which for the purpose of describing this sequence of operations will be considered to be press unit 26 of FIG. 7, but as will be explained more fully hereafter may be of a modified design, is shown midway between the second station S2 and the third station S3. At this point unit 1A is turned through an angle of 180° on turntable 18 (FIG. 2) and then is moved towards station S3 where the belting 5A is located between platens 27 and 28. Unit 1A then moves up to unit 2G as shown in FIG. 3, latch mechanism 61 secures it to unit 2G and edge irons 48 engage the sides of the belt, and are located in position by pins 51. Assemblies 53 close the platens on the belt under low pressure. The platens, being continuously steam-heated are already hot, and curing begins. Curing proceeds under increasing pressure from piston and cylinder assemblies 53 as the belt and attached press units move slidably and stopwise through the press supported on the fixed guide member 37 as already described, in conjunction with the appropriate clamping operations of clamps 6, 7, 8, 9, 10, 11, 12 and 13.

During curing, appropriate adjustments to fluid pressures and other control operations are effected by engagement of the controls of panels 59 and 60 with levers and cams suitably positioned as the press unit slides along fixed base member 37.

As unit 1A reaches station S4, the pressure on the platens is released, the latch mechanism disengaged, the edge irons released, and wheels 46 and 47 engage fixed overhead guide rails (not shown) causing the upper part of the press unit to be disengaged from the belt, after which it rejoins the lower part, the whole unit then again sliding on a fixed guide member between stations S4 and S1. The unit is again turned through an angle of 180°, thus completing one curing operation.

Figure 8:
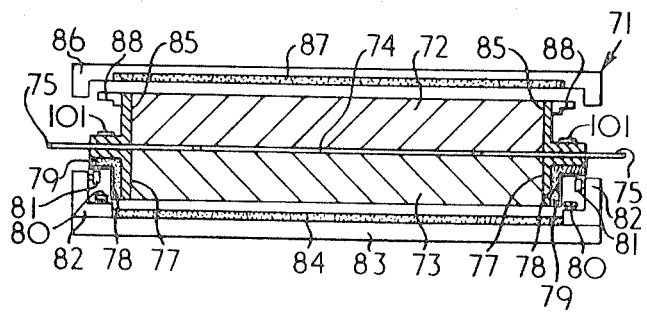
FIG. 8 shows a transverse cross-section through a press unit designed for intermittent heating and for use with fixed presses.
Figure 9:
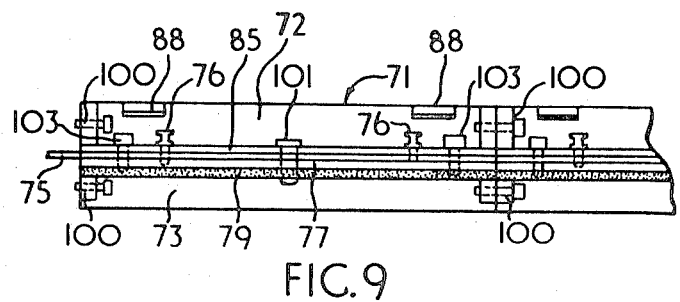
FIG. 9 shows a longitudinal cross-section through part of two adjacent press units of the type shown in FIG. 8 showing the platens clamped end to end.

FIGS. 8 and 9 show a modified press unit arranged to be heated intermittently and used in conjunction with means independent of the press unit for applying a suitable compressive force to the belt.

It has been found that the initial compressive force which must be applied to belting in order, for example, to squeeze the rubber into the interstices of the tensile member, and to produce a uniform belt surface, need not be applied throughout the curing time of the belt. It is sufficient for this force to be applied at the beginning of each curing operation and reduced thereafter for the remainder of the operation to a magnitude which is still sufficient however to overcome pressure between the platens due to the formation of steam from moisture present in the article being cured.

Thus fixed presses may be provided through which the press units successively pass in commencing a curing operation, the fixed presses being of substantial construction and of a form similar to that of a conventional belting press.

As shown in FIGS. 8 and 9, press unit 71 comprises platens 72 and 73 between which is located a portion 74 of a length of conveyor belting. Edge-forming means such as edge irons 75 similar to the irons 48 employed in the press 26 depicted in FIGS. 5 to 7 are provided, with edge iron pins 76 associated with upper platen 72 co-operating with a series of apertures (not shown) formed in each edge iron as previously described in connection with edge irons 48.

Lower platen 73 is provided with a pair of right-angled mild steel angles 77 one limb of each of which is secured to and provides a facing for one side edge face of the platen, the other limb providing a lateral extension to the belt-contacting surface of platen 73.

A second pair of right-angled mild steel angles 78 of smaller gauge metal than the angles 77 is located in the angle between the limbs of the angles 77, and between the angles 77 and the angles 78 is a right-angle section layer of insulating material 79, to minimise the loss of heat from the platen. The assembly of platen angles and insulation material being secured together to form a unified structure.

Mild steel angles 78 serve as guide and support surfaces for the press unit and engage guide wheels 80 rotatable in a horizontal plane, and support wheels 81 rotatable in a vertical plane mounted on right-angled support brackets 82 fixed to and extending along the length of the press with base 83. Between support brackets 82, and fixed to base 83 is a layer of insulation 84, the arrangement being such that the platens are supported by support wheels 81 so that there is an air gap between the upper surface of insulation layer 84 and the lower surface of platen 73.

Upper platen 72 is also provided with a pair of right-angled mild steel angles 85 corresponding to the angles 77, one limb of each of which is secured to and provides a facing for one side edge face of the platen 72, the other limb providing a lateral extension to the belt-contacting surface of platen 72.

The platens 72 and 73 of press unit 71 are of such a thickness that their thermal capacity is sufficient for their surface temperature to remain at the curing temperature for a rubber-based belt for an appreciable length of time after initial heating without requiring any further addition of heat. For example it has been found that the thermal capacity of a three-inch thick platen is more than sufficient for the purpose of vulcanizing a one-inch thick belt.

Heat is supplied to the platens at re-heat stations by bringing the platens into contact with hot metal plates as will be described hereafter. Other satisfactory methods of re-heating the platens include the use of infrared heating units and direct heating by gas flames of the outer surfaces of the platens which surfaces do not contact articles to be cured.

Employment of an intermittent supply of heat has the advantage that before the platen is brought into contact with the article to be cured, it can be heated to a temperature higher than that normally used for the curing of the article so that heat penetrates from the surface of the article to its centre portion more quickly, thus providing a shorter curing time. The loss of heat from the surface of the platen to the article cools the platen surface so that over-curing of the article can easily be avoided.

As press unit 71 moves along the press in the course of a curing operation, heat losses from the upper surface of upper platen 72 are minimised by the provision of a stationary canopy 86 extending along most of the length of the press and having a lining 87 of insulating material.

Two lifting lugs 88 are secured to each angle 85 at the side of press unit 71 whereby the upper platen may be lowered and lifted by external means (not shown) as required to engage and disengage the belting 75 at the beginning and end of a curing operation.

A sequence of operations during curing, employing press units as already described with reference to FIGS.

Figure 11:
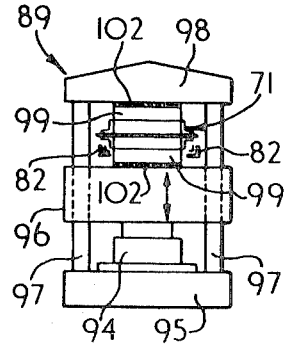
FIG. 11 shows a vertical cross-section through a single daylight fixed press having reheating means in the form of hot plates, for the platens of the press units, a press unit being shown in position.

8 and 9, and fixed presses 89 which incorporate platen re-heating apparatus (see FIG. 11) will now be described with reference to FIG. 13.

Figure 13:
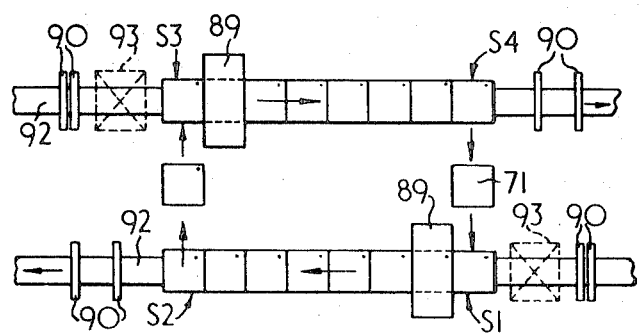
FIG. 13 is a diagrammatic plan view representation of a stage in the course of continuous curing of two conveyor belts side-by-side at the same level, employing single daylight fixed presses.

In FIG. 13 the arrangement and general mode of operation of press units 17 (only one being numbered), clamps 90 for tensioning the belts 91 and 92 and preheat stations 93 for pre-heating the belt are as previously described with reference to FIGS. 1 to 4.

At the first station S1 in FIG. 13, the belt 91 is located between the platens 72 and 73 of press unit 71. Edge irons engage the edges of the belt and the press unit is secured to its adjacent unit by screw-threaded unit clamping means 100 operated by external means. Locating pins 101, one on each side of each press unit and passing through apertures formed in angles 77 and 85 ensure accurate alignment of the platens. The press unit is then moved on wheels 81 and guided by wheels 82 to fixed press 89 (see FIG. 11) where by operation of piston and cylinder assembly 94 mounted on flexible base 95, movable lower table 96 slidably mounted on guide members 97 is urged towards upper table 98 thereby causing hot plates 99 insulated from the tables by insulating layers 102 to engage the platens and the press unit to be lifted off wheels 81.

While the press unit 71 is under compression in fixed press 89, platen clamping means in the form of four platen clamping screws 103, two at each side edge of the press unit and passing through angles 77 and 85, are operated by external means so that on emergence of the press unit from the fixed press the platens are retained at substantially the proximity they assumed in the fixed press thereby maintaining part at least of the compression.

After a predetermined interval the press unit leaves the fixed press 89 and moves in stages in a manner similar to that already described in connection with FIGS. 1 to 4, towards the second station S2. Curing continues as the thick platens maintain the portion of belting with which they are engaged at its curing temperature while the unit rides along on the supporting wheels 81 under the canopy 86.

At the second station the unit is released from its adjacent units by releasing the unit clamping means 100, compression is released by releasing clamping screws 103, and locating pins 101 and edge iron pins 76 are disengaged, all by external means (not shown), and the upper platen lifted away from the belt by means of lugs 88. The lower part of the unit is moved away from the belt, joined by the upper part and the whole unit transferred to the third station S3 but without being turned round since this is unnecessary because no flexible connections such as steam pipes are made to the press unit. At the third station S3, the sequence of operations just described is repeated and the press unit moves with belt 92 to the fourth station and thence back to the first station again.

Figure 10:
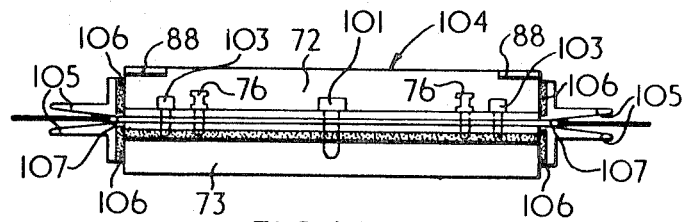
FIG. 10 shows a longitudinal cross-section through a press unit otherwise similar to that of FIGS. 8 and 9, but designed to be spaced apart from adjacent press units during a curing operation.
Figure 12:
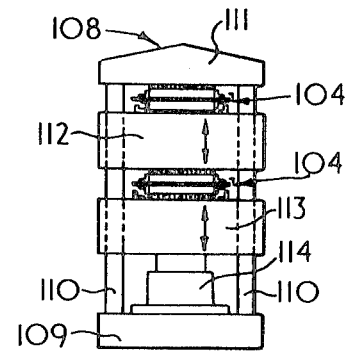
FIG. 12 shows a vertical cross-section through a double daylight fixed press, two press units being shown in position.
Figure 14:
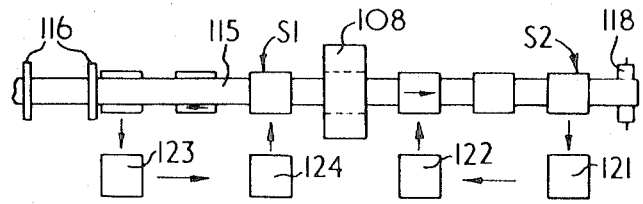
FIG. 14 is a diagrammatic plan view representation of a stage in the course of continuous curing of a single length of conveyor belting employing double daylight fixed presses.
Figure 15:
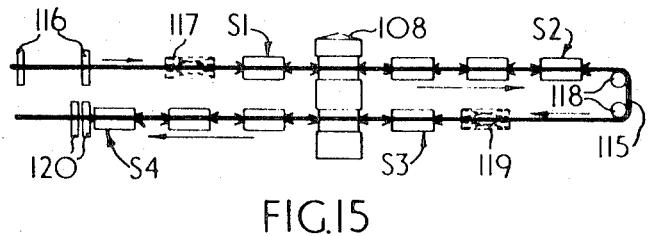
FIG. 15 is a diagrammatic representation of an elevation of the apparatus shown in FIG. 14.

The press unit 104 shown in FIG. 10 is designed for use in the apparatus represented in FIGS. 14 and 15, using the double daylight fixed press of FIG. 12. This apparatus is intended to be used where it is not convenient to provide for simultaneous cure two belts having more or less the same curing time and length, as is desirable for the apparatus described above. The press unit 104 is a modification of the press unit 71 of FIGS. 8 and 9 in that it is arranged so that during a curing operation units of this type are spaced apart from one another along a length of the article being cured. Consequently there is no screw-threaded unit clamping means corresponding to that of press unit 71 (FIG. 9). At each end of press unit 104 there are provided four substantially L-shaped end pieces 105, each secured to an end surface of one of of the platens through an intermediary insulation layer 106 by one of the limbs of the L, the other limb serving to extend longitudinally of the belt contacting surface of the platen but being shaped so that these extended surfaces provided by adjacent end pieces slope away from each other.

Insulated from the hot platens by the insulaitng layers 106, the end pieces 105 remain relatively cold (water cooling being used if required), and thereby ensure that at each end of the press unit, there is a strip 107 of the belt, extending across the belt which is under compression but which is substantially unheated thus preventing hot viscous rubber from being squeezed out from the ends of the unit and avoiding consequent irregularities on the surface of the belt at the ends of the press unit.

Other features of press unit 104 are substantially the same in structure and function as those of press unit 71 of FIGS. 8 and 9 and are numbered accordingly.

Fixed press 108 comprises a horizontal base 109, side members 110 secured thereto in vertical positions, a fixed upper table 111 secured to the upper ends of side members 110, an upper moving table 112 and a lower moving table 113 both slidably located on side members 110 between the base and the fixed upper table, and a fluid-operated piston and cylinder assembly 114 located between the lower moving table and the base.

As shown in FIGS. 14 and 15 the belt 115 extends in an upper run through tensioning clamps 116, belt preheat station 117, a first station S1, the upper daylight of double daylight fixed press 108, through a second station S2 to rollers 118, and in a lower run from rollers 118 through pre-heat station 119, third station S3, the lower daylight of double daylight fixed press 108 through fourth station S4 and tensioning clamps 120. Thus the first and second stations are at one level and the third and fourth stations at another level and the belt is arranged to move in two runs, one above the other, one run between the first and second stations and the other run between the third and fourth stations.

Tensioning clamps 116 and 120 operate in the same way as clamps 6, 7, 8 and 9 of FIGS. 1 to 4. On engaging the belt at station S1 press unit 104 with pre-heated platens moves to the upper daylight of fixed press 108 where it is compressed by operation of piston and cylinder assembly 114 and its platens clamped together. The press unit then moves stepwise to station S2 where it is disengaged from the belt, transferred laterally to iron charging station 121 and then to re-heat station 122 which is at the level of the lower run of the belt where its platens are re-heated. At station S3 it engages a substantially uncured portion of the belt 105, thereby filling in an uncured "gap" passes to the lower daylight of fixed press 108 where it is compressed again, its platens clamped together and it begins another curing operation. At station S4 the press unit is again disengaged from the belt and transferred via iron charging station 123 and re-heat station 124 to the upper run and back to staton S1, where another cycle of operations begins.

As a result of the sequence of operations just described, in a press comprising a series of press units, the belting leaving station S2 is in the form of a series of fully cured portions separated by uncured portions shorter in length by a small amount than a press unit. The further curing operations on the lower run of the belt cure these uncured portions of the belt, thus producing a fully cured belt.

The number and size of the press units used for any press according to the invention is not critical and depends largely upon the time necessary for cure, the space available to accommodate the press and the output required. A large number of units will give a greater output than a smaller number but will need a greater amount of space and more frequent progression of press units. A convenient number of press units is 4–10.

With regard to the size of the units, the greater their length, i.e. in the direction of the longitudinal axis of the article to be cured, the greater will be the output, but progression of the press units will require greater effort.

The embodiments of the invention described above have several major advantages over previous systems of curing. They can be operated continuously without the need to stop when one length of belt is completed and another started; the belt being manufactured is continuously under pressure until curing is completed, changing of the means to form the edges of the belts and determine the thickness is easily carried out automatically if required; difficulties caused by partial curing at the end of a stationary press are eliminated; preheating can be more expeditiously effected; the labour required is reduced and more accurate belts can be produced owing to the alignment facilities provided and the greater ease with which it is possible to manufacture and maintain the surfaces of the press units in a truly flat condition compared with the large surfaces required for existing presses.

Having now described my invention, what I claim is:

1. A curing press comprising press units arranged to apply compressive forces to an elongated article to be cured, the press units being arranged to be successively brought into curing relationship with successive portions of the article, stepwise transfer means arranged to move the article and a plurality of press units in curing relationship therewith in a stepwise manner in the direction of the length of the article and a fixed pressing station to apply compressive forces to respective portions of the article while stationary between successive stepwise movements.

2. A curing press according to claim 1 wherein each press unit comprises a pair of platens to be brought into curing relationship with an article to be cured, and platen clamping means to cause the platens to maintain compressive forces on the article when the press unit leaves the pressing station.

3. A curing press according to claim 1 comprising heating means for raising the temperature of the press units, the heating means having a heated surface for engagement with the press units while the press units are stationary between successive stepwise movements.

4. A curing press according to claim 3 wherein the heating means constitutes part of a fixed pressing station the station being arranged for the application of compressive forces to successive press units by the heated surface.

5. A curing press according to claim 1 wherein two edge-forming members are provided for each press unit, one for engagement with each of the longitudinally-extending side edges of an elongated article to be cured.

6. A curing press according to claim 1 wherein the press is provided with tension clamps arranged to engage a flexible elongated article to be cured and to maintain the article under suitable longitudinal tension during curing.

7. A curing press according to claim 6 wherein said tension clamps comprise longitudinally fixed clamps and longitudinally movable clamps operable in combination to allow the flexible article to be moved stepwise through the press under substantially constant tension.

8. A curing press according to claim 1 wherein thrust means is provided for urging successive press units into end-to-end engagement with each other during curing.

9. A curing press according to claim 8 wherein said thrust means comprises a cylinder pivotally mounted at one end of each press unit for angular movement in the plane of the press unit, a piston located in the cylinder and having a piston rod with an abutment at the free end thereof, and a latch portion at the other end of the press unit engageable with the abutment on the piston rod of the next following press unit so that on engagement of the abutment of one press unit with the corresponding latch of the adjacent press unit and admission of fluid pressure to the cylinder the piston may be withdrawn and the two press units may be urged together.

10. A curing press according to claim 5 wherein the edge-forming members are in the form of plates adapted to be positioned by fluid pressure-operated means, the plates having apertures adapted to cooperate with pins arranged to hold the plates in a required position.

11. A curing press according to claim 1 wherein a fixed base member is provided on which the press units are slidable during their stepwise movement through the press.

12. A curing press according to claim 5 comprising means adapted successively to replace the edge-forming members of successive press units before their stepwise movement through the press and to alter the transverse spacing of the edge-forming members according to the dimensions of the article next to be engaged by the press units.

13. A curing press according to claim 1 wherein each press unit comprises two platens, the platens having a thermal capacity such that after initial heating the platens remain at the curing temperature of an article being cured for an appreciable length of time without requiring any further addition of heat.

14. A curing press according to claim 1 wherein means is provided to preheat the article to be cured before it is engaged by the press units.

15. A curing press assembly comprising first and second curing presses according to claim 1 and interpress transfer means to transfer press units successively from one end of the first press to the corresponding end of the second press and from the other end of the second press to the corresponding end of the first press.

References Cited

UNITED STATES PATENTS

| | | | |
|---|---|---|---|
| 694,087 | 2/1902 | Bowen et al. | 18—17 B |
| 1,905,663 | 4/1933 | Wallace | 18—6 E |
| 2,396,042 | 3/1946 | Evans | 18—17 B |
| 2,602,960 | 7/1952 | Fischbien | 18—6 E X |
| 2,728,942 | 1/1956 | Wallace | 18—6 E |
| 3,353,216 | 11/1967 | Siempelkamp et al. | 18—17 B |

ROBERT L. SPICER, JR., Primary Examiner

U.S. Cl. X.R.

18—4 B, 5 A, 6 E, 17 B, 17 P